United States Patent [19]
Petit et al.

[11] 3,824,015
[45] July 16, 1974

[54] METHOD OF, AND APPARATUS FOR, THE OPTICAL MEASUREMENT OF THE SPEED AT A MOVING PRODUCT

[75] Inventors: Pierre Petit, Metz; Pierre Verjux, Semecourt, both of France

[73] Assignee: Institut de Recherches de la Siderurgie Francaise (Irsid), St. Germain-en-laye, France

[22] Filed: Oct. 24, 1972

[21] Appl. No.: 300,161

[30] Foreign Application Priority Data
Oct. 3, 1972 France .............................. 72.38963

[52] U.S. Cl. .................... 356/28, 324/160, 324/175
[51] Int. Cl. .............................................. G01p 3/36
[58] Field of Search ...... 324/160, 172, 175; 356/27, 356/28

[56] References Cited
UNITED STATES PATENTS
3,689,157   9/1972   Andermo ........................... 324/175

FOREIGN PATENTS OR APPLICATIONS
1,922,461   11/1970   Germany ........................... 324/175
680,331     2/1964    Canada ............................. 324/172

*Primary Examiner*—Alfred E. Smith
*Assistant Examiner*—Rolf Hille

[57] ABSTRACT

Two similar random time delayed signals representing common characteristics of moving discrete objects or products are picked up by detecting means arranged adjacent to the path of the objects and converted to digital signals. The digital signals are applied to a correlator provided with time delay means, the correlator generating two values of the correlation function of the two signals. These two values are compared to form a control signal for controlling the time delay means through a voltage frequency converter, the initial value of the time delay being fixed by means of a signal generated by an apparatus measuring the speed of the object extremity, said latter-named signal being applied to the input of the voltage frequency converter through summing means receiving the control signal of the time delaying means.

6 Claims, 2 Drawing Figures

METHOD OF, AND APPARATUS FOR, THE OPTICAL MEASUREMENT OF THE SPEED AT A MOVING PRODUCT

The present invention relates to a method of, and apparatus for, the measurement of the speed of discontinuous products, such as rolled metal products, by correlation of two substantially similar time-delayed random signals.

Known apparatus for the correlation measurement of speed generally comprise two spaced apart sensitive devices located adjacent to the path of the moving product, said sensitive devices picking up statistically similar first and second signals, respectively, the second signal being delayed relative to the first signal by a time interval depending upon the relative positions of the two sensitive devices and the speed of the moving product. These signals may be compared by the correlation method, a method well known in the art, according to which a correlation function is derived from the signals, said function having a maximum or correlation peak. The position of the peak is related to the time interval between the two signals and thus to the speed of the product.

The correlation function of two time-delayed substantially similar signals is formed by means of a correlator, many types of such correlators being presently available. Correlators generally include the following elements: delay means for time-delaying one signal, means for multiplying the other signal by said one signal, and means for integrating said signal issuing from the multiplying means over a suitable period.

In the particular case of producing rolled metal products such as slabs, billets, sheets and the like, it may be of importance to know the exact speed of the product being produced in the process, especially when said value is intended to be introduced as input data in an automatic rolling process. Since the rolled products are discontinuous, e.g. having head and tail ends, respectively corresponding to each extremity of the product in the direction of travel, the speed measurement apparatus must be able to measure the speed of the product from the beginning of the movement of the product before the apparatus, said movement occurring rather abruptly, especially with high speed rolling mills. It has already been proposed to explore a representative curve of a correlation function, generated by a correlator adapted to calculate a plurality of values of said function, in order to determine the abscissa of the correlation peak by means of a suitable peak-seeking system. This method involves the operation of generating the entire representative curve of the function. This is excessive since the abscissa of the peak is the only information of interest. Moreover, this method has the disadvantage of allowing only a relatively limited member of measurement sequences per time unit, the speed value being available only after sequential treatment of a plurality of values of the correlation function and addressing of the maximum of said values. This presents a disadvantage in the specific case of measuring the speed of discrete products moving at high speeds.

It has also been proposed to generate from the information issuing at the out-put of the correlator an error signal acting on the time delaying device of the correlator in order to adjust the time interval from which one signal is delayed to block the value of said interval at the value corresponding to the abscissa of the correlation peak. This method may actually be unreliable since the time delay may be blocked at a value corresponding to the abscissa of an irrelevant secondary peak of the correlation curve, this being all the more likely to occur if the speed values substantially differ from one rolled product to the next. It has therefore been proposed to introduce in the control chain of the time delaying device, a signal corresponding to the approximate value of the product speed, said value being estimated by the operator or delivered by measuring means independent of the correlation measurement device. The signal delivered by a tachometer dynamo measuring the rotation speed of the mill rolls may, for example, be applied to the control chain of the time delaying device; due to the relative slippage between the rolled product and the mill rolls, this method however does not allow to give to the time interval an initial value corresponding to the actual apeed of the product at the instant of passage of the head of said product before the sensing devices.

The applicants have sought to obviate or mitigate the disadvantages of known methods with the object of providing accurate and reliable measurements of the speed of a moving product from the beginning of the passage of the product in front of the sensing devices associated with a correlation measurement apparatus. The invention utilizes the fact that the signal picked up by the sensing devices could be treated in two different but complementary ways, it being however assumed that the product presents a discontinuity allowing such a treatment. The passage of a discontinuity such as the head of a product opposite each sensing device gives rise to a forward signal, the original disclosing a leading edge, and the signal detected afterwards presenting a random pattern, the variations of said random signal being of comparatively small magnitude as regards the magnitude of the leading edge of the signal. The invention derives from two successive forward signals respectively generated at the instant of passage of the heads of the products in front of each sensing device a value of the corresponding product speed, not with the object of measuring said speed, but with the primary object of introducing said value in the control chain of the time delaying device of a correlator for treating the random signals detected by the sensing devices after the passage of the head of the product before said sensing devices. This arrangement avoids the step of peak-seeking on a correlation curve generated point by point, while allowing for complete reliability of the measurement. It becomes theoretically possible to generate only one value of the correlation function, since the treatment of the signal leading edges corresponding to the successive passages of the head of the product permits value of the time delay to be set at a value corresponding to the abscissa of the correlation peak for the corresponding speed. However, the random signals which are detected do not actually display a gaussian distribution, and the correlation curve does not feature a sharp peak but a rather damped shape of maximum. It is therefore preferable to evaluate two values of the correlation function respectively located before and after the maximum value and to generate an error signal acting on the control chain of the time delaying device to maintain the time delay at a value corresponding to the speed of the product and to the changes in speed that may occur during the passage of said product in front of the sensing devices.

Accordingly, the present invention provides a method of measuring the speed of a moving discontinuous product by means of detecting and correlating two randomly distributed time delayed substantially similar signals representing common characteristics of the product, the correlation function of said signals being generated by means of a correlator comprising time-delaying means controlled by an error signal. In this method successive signal leading edges picked up at the respective instants of passage of the head of the product opposite the detecting means are used to generate a signal adapted to determine an initial value of the time delay in the time-delayed means, said initial value corresponding to the means value of the product speed between the respective instants of passage of the head of the product opposite the detecting means.

The present invention also provides an apparatus for measuring the speed of a moving discontinuous product comprising two detecting means located adjacent the path of the moving product and a correlator comprising time delaying means consisting of a shift register having two outputs for picking the input signal. The shifting frequency is controlled through a voltage frequency converter by an error signal generated by a differential amplifier the input of which is connected to the output of the correlator. The input of the voltage frequency converter is connected to the output of summing means the input of which is connected to the output of the differential amplifier and to the output of a speed measuring means generating an analog signal proportional to the mean speed of the product between the respective instants of passage of the head of the product opposite the detecting means.

The method according to the present invention provides for the measurement of the accurate speed of a product from the initial instant of passage of said product opposite the detecting means, whatever might be the value of the speed at this initial instant, because of the fact that the time interval from which one of the two detected random signals picked up at the instant of passage of the product head is delayed is quasi-instantaneously fixed at a value corresponding to the actual moving speed of the product head at this instant. The correlator is arranged to control the value of this delay and maintain it at the value corresponding to the abscissa of the correlation peak, without blocking said delay value at a value corresponding to an irrelevant secondary peak of the correlation curve. The control chain provides means to track the abscissa of the correlation peak during the passage of the product and thus to deliver continuously the actual speed of the product. The representative curve of the correlation function being symmetrical, it thus becomes sufficient to generate the value of this function for only two delay values corresponding to points of said curve necessarily arranged on both sides of the correlation peak. When the differential error signal derived from the two values of the correlation function is other than zero, the error signal simultaneously acts on both delay values to maintain the two values of the correlation function identical. The value of the delay corresponding to the actual speed of the moving product is then given by half summing the respective delays corresponding to these identical values.

The invention will now be described by way of example with reference to the accompanying drwings, in which.

Figure 1:
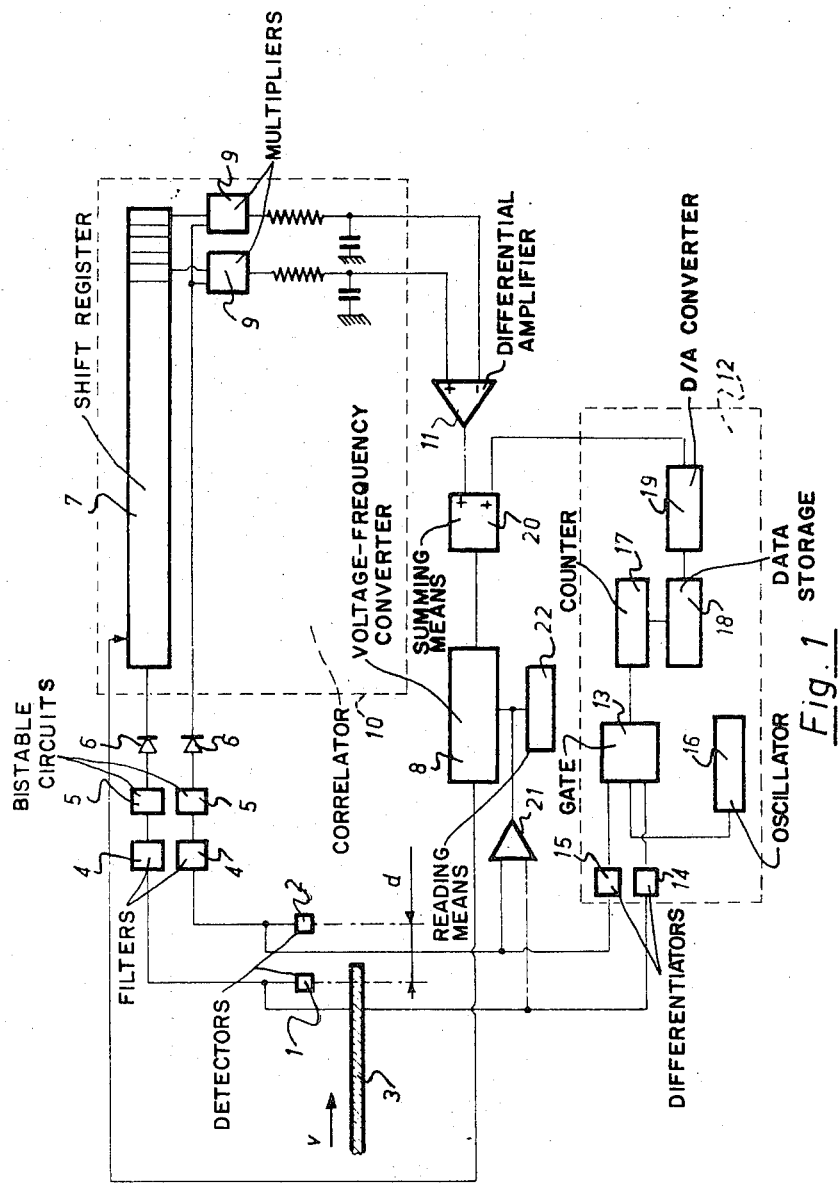
FIG. 1 shows schematically one form of apparatus for the measurement of the speed of a moving product.

Referring to FIG. 1, two detecting means 1, 2 are arranged adjacent a moving discontinuous product 3, said detecting means being set apart by a distance $d$ in the direction of travel of the product. The moving product may be for example a hot rolled product, a suitable discontinuity being formed by the head or leading edge of this product.

The light energy radiated by each surface element of the product varies from one element to another and the signal thus available can be picked up by sensing devices consisting of the detecting means, each of said detecting means featuring a photoelectric cell adapted to deliver an electrical signal $f(t)$ representative of the light $f(x)$ radiated by the product along an axis parallel to the speed direction, the values $x$ and $t$ being related by the relationship $$x = v \cdot t$$

in which $t$ is the time and $v$ the speed of the product. Two substantially similar signals $x(t)$ and $y(t)$ are therefore generated. The photoelectric detecting means comprise a silicon photoelectric cell, a diaphragm consisting of a slot arranged perpendicularly to the direction of displacement of the product, and an optical lens, and is adapted to form an image of a surface element of the product on the photoelectric cell. Two such detecting means are arranged on a structural support, the distance between their respective optical axis being accurately measured by known methods, for example by catching light beams reflected by slanted mirrors associated with the diaphragms and simultaneously aiming them at a graduated object.

Figure 2:
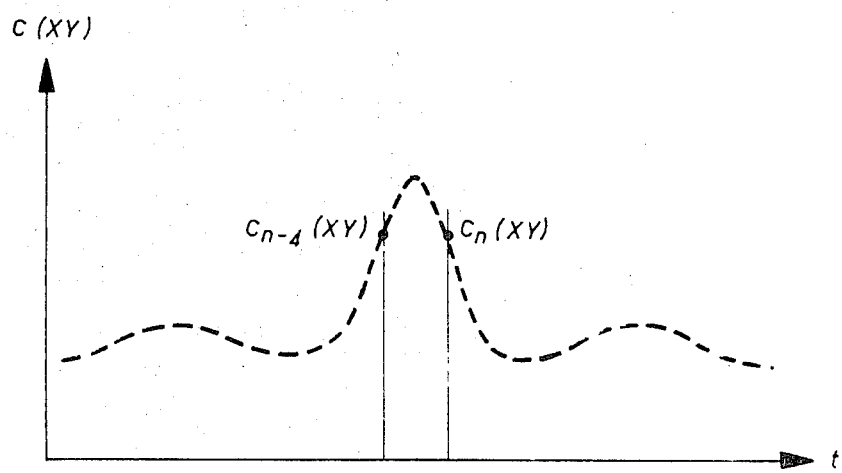
FIG. 2 illustrates the position of two values of the correlation function on a graph of the representative curve of said function.

The output signals of the detecting means are respectively introduced after an eventual amplification in a high-pass filter 4 in order to eliminate the low frequency components of the signals that may result from eventual undulations of the product and from parasitical sources, and to keep the only meaningful components corresponding to the actual variations of the radiated light. This filter may consist of an RC circuit with a variable capacitor to set the cut-off frequency for example between 50 Hz and 1,000 Hz. The signals are respectively introduced after filtering to an electrical bistable circuit 5 generating at its output signals having either one of two equal but opposite values, in order to convert the fluctuating analog input signals to pulse form. After eliminating the negative pulses of the output signals by means of a diode 6, the derived signals form pulse trains, level 1 being determined by a suitable limiter. The two generated signals $X(t)$ and $Y(t)$ thus consist of statistically similar random pulse trains representative of the analog signals detected by the detecting means, the signal $X(t)$ corresponding to the first signal detected, the signal $Y(t)$ corresponding to the second signal detected in the direction of travel of the product. These signals are substantially identical and delayed one as regards the other from a time interval depending from the distance $d$ and the speed $v$. In order to generate the correlation function of the signals $X(t)$ and $Y(t)$, the signal $X(t)$ is applied at the input of a delaying means introducing a delay and the integral of the product $X(t-\tau)$, say $C(XY)$ is formed. The delaying means consist of a shift register 7 driven by a variable frequency oscillator 8 consisting of a voltage frequency converter, said shift register having $n$ stages and two outputs for the delayed signal respectively on stages $n$ and $n-4$ which are symmetrical as regards stage $n-2$. In the specific case described, the shift register comprises 205 stages and its two outputs are on stages 201 and 205. A multiplier circuit 9 of a known type is arranged respectively at each output of the shift register in order to generate the respective products.

$$Y(t) \cdot X_{201}(t) \text{ and } Y(t) \cdot X_{205}(t)$$

in which $X_{201}(t)$ and $X_{205}(t)$ represent the output signals read from stages 201 and 205 of the shift register. These products are integrated by means of RC circuits over a suitable period. The assembly comprising the shift register, the multiplier circuit and the integrating circuit forms a correlator 10. Consequently the correlator 10 generates two values of the correlation function over each period of integration, say $$D_{201}(XY) \text{ and } C_{205}(XY)$$

respectively, corresponding to time delays $\tau$ of the signal $X(t)$ of 201 $\theta_r$ and 205 $\theta_r$ where $\theta_r$ is the period of the driving oscillator 8. The value of the initial frequency of this oscillator is such that the mean value of the delays 201 $\theta_r$ and 205 $\theta_r$ is substantially equal to the actual delay between the signals $X(t)$ and $Y(t)$ corresponding to the mean speed of the product 3 between the instants of passage of the head of said product opposite the detecting means, as it will be further explained herebelow. The detecting means are set apart a relatively short distance as is the usual practice in the art. The speed of the product being likely to show but very small variations in the time interval between the two instants of passage of the product head opposite the detecting means, this mean speed can be regarded as the actual speed of the product at the instant of passage of the product head opposite the second detecting means in the direction of travel of the product. The positions of the two representative points of the correlation curve corresponding to values of the time delay $\tau$ respectively of 201 $\theta r$ and 205 $\theta r$ are shown on the graph of FIG. 2. The two values of the correlation function corresponding to these points are applied to the input of a differential amplifier 11 the output of which is connected to the voltage frequency converter 8 associated with a speed reading means 22, said voltage frequency converter acting as driving means of the shifting frequency of the shift register, thus forming a control chain for the time delay $\tau$.

The initial frequency of the converter 8 is set by means of an apparatus 12 connected to the detecting means and generating an analog signal representative of the mean speed of the product head between the respective instants of passage of said product head opposite the detecting means. This apparatus comprises a gate circuit 13, the opening of which is triggered by a pulse signal generated by differentiating in a differentiating circuit 14, the signal leading edge picked up by the first detecting means in the direction of travel of the product at the instant when the product head passes opposite said first detecting means. The closing of said gate is triggered in the same fashion by a pulse signal generated by a differentiating circuit 15 at the instant when the product head passes opposite the second detecting means in the direction of travel of the product.

During the whole period of time when the gate is open, it allows a series of pulses generated by an oscillator 16 to enter a pulse counter 17. The number of pulses in the pulse series is representative of the needed time interval for the head of the product to travel from the first detecting means to the second detecting means. This information is transferred to a data storage stage 18 including an inversion table to form the inverse value of the pulse number, said value being applied to a digital analog converter 19 which thus delivers at its output an analog signal representative of the mean speed of the product between the two instants of passage of the product head opposite the two detecting means. This signal is applied at the input of the voltage frequency converter 8 through a summing means 20, whereby the initial shifting frequency defining the value of the time delay $\tau_{203}$ of the signal $X(t)$ in stage 203 of the shift register is such that this time delay $\tau_{203}$ substantially corresponds to the actual speed of the product at the instant of passage of the product head opposite the second detecting means.

The error signal available from the respective values of the correlation function $C_{201}(XY)$ and $C_{205}(XY)$ derived from signal $Y(t)$ on one hand, and signals $X_{201}(t)$ and $X_{205}(t)$ respectively issuing from stages 201 and 205 of the shift register on the other hand acts upon the initial time delay $\tau_{203}$ to keep it equal to the actual time interval between the two random signals detected during the whole travelling time period of the product opposite the detecting means.

The two signal trailing edges corresponding to the passage of the end extremity or tail of the product opposite the detecting means generate negative pulses through differentiating in circuits 14, 15, the gate circuit 13 being designed not to react to such negative pulses. These signals are applied to a logic circuit 21 delivering an output signal when both inputs are received. This output signal is applied at the input of the speed reading means 22 in order to block the transfer from the frequency value of the voltage frequency converter 8 to said speed reading means and simultaneously reset the speed value to zero. The speed reading means 22 actually consists of a frequency meter associated with an appropriate divider and connected at the frequency output of voltage frequency converter 8.

The speed value at a given instant is equal to the quotient obtained by dividing the distance $d$ between the two optical axis of the detecting means by the time delay 203 $\theta$ in which $\theta$ is the period of the pulses generated by voltage frequency converter 8 when the two generated respective values $C_{201}(XY)$ and $C_{205}(XY)$ of the correlation function are identical, since these values of the correlation function correspond to points of the correlation curve each being located on one side of the correlation peak of said curve, this curve being, as it has been said before, a symmetrical curve as regards the vertical axis passing through the peak. Given $f$ the corresponding frequency of the voltage frequency converter 8, the speed is then $$v = d/203\,f$$

The selection of two outputs on the shift register corresponding to a signal $X(t)$ delayed on two stages distant from each other from an odd number of stages enables an integer to be derived for dividing the product $d.f$ in order to obtain the speed value. The speed value may be read on the speed reading means 22 connected to the voltage frequency converter 8 and/or directly applied as input data toan automatic rolling control apparatus. It is also possible to provide the speed reading means with an analog output for recording the speed values.

The method according to the present invention allows for the designing of a rather simple apparatus and provides for reliable and accurate measurement of the speed of a moving product. The automatic setting of the initial frequency of the voltage frequency converter driving the shift register at a value corresponding to the actual speed of the product at the instant of passage of the product head opposite the detecting means enables the speed changes from the very first instant of passage of the product to be sensed and irrelevant measurements corresponding to secondary peaks of the representative curve of the correlation function to be avoided.

What is claimed is:

1. A method for measuring the speed of a moving discontinuous product comprising:

detecting first and second electrical signals at two spaced apart points in the direction of motion of the product, whereby said first signal has a leading edge representative of the passage of the forward edge of the product and a trailing part having a random pattern representative of surface characteristics of the product, and said second electrical signal has a form substantially similar to the form of said first electrical signal, said second signal being delayed relative to said first signal by a time interval that is a function of the distance between said two points and the speed to be measured;

measuring the time interval between the leading edges of said first and second electrical signals and deriving therefrom a third signal substantially representative of the mean speed of the product between the respective instants of passage of the forward edge of said product at said two points;

generating a fourth signal and a fifth signal by delaying said first electrical signal by two different time delays having an initial mean value that is a function of said third signal;

generating two values of the correlation function of said first and second electrical signals by multiplying and integrating respectively said second and fourth signal and said second and fifth signal, whereby said two values of the correlation function correspond to the two values of the time delays applied to said first signal;

deriving a differential error signal from said two values of the correlation function;

and controlling the time delays applied to said first signal to respectively generate said fourth and said fifth signal so as to maintain said differential error signal at substantially zero; whereby the speed value of said product may be continuously derived from the mean value of said time delays.

2. An apparatus for measuring the speed of a moving discontinuous product comprising first and second detection means positioned along the path of the product in a spaced apart relationship in the direction of motion of said product for generating first electrical signal and a second electrical signal respectively, said second signal being time-delayed relative to said first signal, whereby said first and second signals represent common characteristics of the product and each having a leading edge representative of the passage of the forward edge of the product, and a trailing part having a random pattern representative of surface characteristics of the product;

controllable delay means connected to said first detection means for providing two signals having different delays with respect to said first signal;

correlation function generation means, means applying said delayed signals and said second signal to said correlating function generation means, said correlation function generation means being adapted to generate two values of the correlation function of said first and second electrical signals;

a differential amplifier connected to said correlation function generator means for generating an error signal from said two values of the correlation function;

control means having an input connected to said differential amplifier for receiving said error signal, and an output connected to said delay means for controlling the delay in said delay means;

and speed measuring means having first and second inputs connected to said first and said second detection measn respectively, and having an output connected to the input of said control means;

said speed measuring means comprising time measuring means for generating a signal corresponding to the time interval between the leading edges of said first and second electrical signals;

and inversion means connected to said time measuring means for generating an output signal representative of the inverse value of said time interval;

whereby said output signal is substantially representative of the mean value of the speed of the product between the respective instants of passage of the forward edge of said product past said first and second detection means, and means applying said output signal to the input of said control means in order to set the initial mean value of the two delays in said delay means at a value that is a function of said mean speed of the product.

3. A method for measuring the speed of a moving discontinuous object having a detectable discontinuity, of the type wherein first and second detectors are provided at points spaced apart in the direction of movement of the object to provide first and second signals having leading edges corresponding to the passage of the object and trailing parts with random patterns representative of surface characteristics of the objects, comprising producing a third signal corresponding to the time interval between the leading edges of said first and second signals, producing fourth and fifth signals that have different delays with respect to said first signal, initially controlling the delays of said fourth and fifth signals whereby the mean delay is a function of said third signal, multiplying each of said fourth and fifth signals with said second signal and integrating the results of the multiplication steps to produce two values of the correlation function of said first and second signals, deriving a differential error signal from the true values of the correlation function, and controlling the delays of said fourth and fifth signals as a function of said error signal in a sense to reduce the amplitude of the error signal, whereby the mean value of the delays of the fourth and fifth signals correspond to said speed.

4. In an apparatus for measuring the speed of a moving discontinuous object having a detectable discontinuity, of the type wherein first and second detectors are provided at points spaced apart in the direction of movement of the object to provide first and second signals having leading edges corresponding to the passage of the object and trailing parts with random patterns representative of surface characteristics of the objects; the improvement comprising controllable and delay means connected to receive said second signal for producing fourth and fifth signals that have different delays with respect to said second signal, multiplying an integrating means connected to separately multiply each of said fourth and fifth signals with said first signal and to integrate the results of the multiplication for providing signals corresponding to two values of the correlation function of the first and second signals, differential amplifier means connected to said multiplying and integrating means for providing an error signal from the signals corresponding to the two values of the correlation function, means responsive to said error signal connected to control the mean delay of the delays in said delay means in the sense to reduce said error signal, whereby the speed of said object is a function of said mean delay, means connected to said first and second detectors for producing a third signal that is an inverse function of the time interval between the leading edges of said first and second signal, and means applying said third signal to said means for controlling said mean delay for setting the initial mean value of the delays of the fourth and fifth signals whereby said initial mean value is a function of the mean speed of said object.

5. The apparatus of claim 4 wherein said delay means comprises a shift register having an input and two fixed outputs, means applying said second signal to said input, and means deriving said fourth and fifth signals from separate outputs of said shift register, and wherein said control means is a voltage to frequency converter connected to said shift register.

6. The apparatus of claim 5 wherein said means for producing said third signal comprises oscilator means, counter means, gate means connected to receive said first and second signals for applying the output of said oscilator means to said counter means only during the time interval between the leading edges of said first and second signals, digital to analogue converter means, and means applying a digital signal that is a function of the count of said counter means to said converter means whereby the output of said converter means is said third signal.

* * * * *

UNITED STATES PATENT OFFICE
CERTIFICATE OF CORRECTION

Patent No. 3824015      Dated July 16, 1974

Inventor(s) Pierre Petit, et al

It is certified that error appears in the above-identified patent and that said Letters Patent are hereby corrected as shown below:

On the title page: Please change the foreign application priority date from "Oct. 3, 1972" to --Oct. 29, 1971--; change the foreign application priority number from "72.38963 to --71.38963--.

Column 3, line 14: Change "means" to --mean--.

Column 3, line 66: Change "drwings" to --drawings--.

Column 7, line 3: Change "toan" to --to an--.

Column 8, line 27: Change "measn" to --means--.

Signed and Sealed this sixteenth Day of September 1975

[SEAL]

Attest:

RUTH C. MASON  
*Attesting Officer*

C. MARSHALL DANN  
*Commissioner of Patents and Trademarks*